United States Patent [19]
Tada

[11] Patent Number: 5,843,519
[45] Date of Patent: Dec. 1, 1998

[54] PROCESS FOR FORMING A CATALYST LAYER ON AN ELECTRODE BY SPRAY-DRYING

[75] Inventor: Tomoyuki Tada, Kanagawa, Japan

[73] Assignees: Tanaka Kikinzoku Kogyo K.K.; Masahiro Watanabe, both of Japan; Stonehart Associates Inc., Madison, Conn.

[21] Appl. No.: 543,632

[22] Filed: Oct. 16, 1995

[30] Foreign Application Priority Data

Oct. 17, 1994 [JP] Japan ................................. 6-277108
Oct. 17, 1994 [JP] Japan ................................. 6-332291
Oct. 28, 1994 [JP] Japan ................................. 6-289288
Oct. 28, 1994 [JP] Japan ................................. 6-289289

[51] Int. Cl.$^6$ ................................................... B05D 5/12
[52] U.S. Cl. ............................. 427/115; 427/58; 429/42
[58] Field of Search .............................. 429/42; 264/104, 264/105, 112; 427/212, 115, 58, 421

[56] References Cited

U.S. PATENT DOCUMENTS 4,652,411  3/1987  Swarr et al. ............................. 264/43
5,186,877  2/1993  Watanabe ................................. 429/42

Primary Examiner—Katherine A. Bareford
Attorney, Agent, or Firm—Klauber & Jackson

[57] ABSTRACT

Disclosed herein are four aspects of processes for preparing an electrode for a solid polymer electrolyte electrochemical cell such as a fuel cell. According to the processes, the electrode having a thin and uniform electrocatalyst layer can be obtained effectively and economically. The processes include a spraying method, a paste rolling method and a dry mixture method.

2 Claims, 5 Drawing Sheets

PROCESS FOR FORMING A CATALYST LAYER ON AN ELECTRODE BY SPRAY-DRYING

BACKGROUND OF THE INVENTION

The present invention relates to a process of preparing an electrode for a solid polymer electrolyte electrochemical cell which, for example, possesses a uniform and thin electrocatalyst layer formed in a relatively short period of time by employing uniform electrode particles and/or a relatively small amount of electrode substance.

Since a solid polymer electrolyte electrochemical cell, for example, a solid polymer electrolyte membrane fuel cell is much compact and can take out a higher current density than a phosphoric acid fuel cell, it is attracting much attention as an electric source of an automobile and a space craft. Also in the development in this technical field, various proposals for electrode structures, processes of preparing a catalyst and system constitutions have been made. FIG. 1 schematically shows a principle and a constitution of a polymer electrolyte fuel cell in which an anode side gas diffusion electrode 4A consisting of an anode side porous catalyst layer 2A and an anode side hydrophobic porous current collector layer 3A bonded with each other is bonded to one surface of an ion exchange membrane 1, and a cathode side gas diffusion electrode 4C consisting of a cathode side porous catalyst layer 2C and a cathode side hydrophobic porous current collector layer 3C bonded with each other is bonded to the other surface of the ion exchange membrane 1. A separator 6A having reaction gas supply grooves 5A is in contact with the anode side gas diffusion electrode 4A and current collecting portions 7A are constituted between the adjacent supply grooves 5A of the separator 6A. Similarly, a separator 6C having reaction gas supply grooves 5C is in contact with the cathode side gas diffusion electrode 4C and current collecting portions 7C are constituted between the adjacent supply grooves 5C of the separator 6C. The fuel cell is prepared by hotpressing the five components. By connecting the both current collector portions 7A and 7C with a lead having a load 8 and supplying hydrogen to the anode and oxygen to the cathode, electric power can be taken out through the load 8.

Electrode particles which are raw material of the electrocatalyst layer of the said electrode of the electrochemical cell are prepared by mixing catalyst particles and ion exchange resin, or catalyst particles, ion exchange resin and hydrophobic resin in an organic solvent and evaporating the organic solvent employing a fan or the like while stirring the dispersion containing the catalyst particles employing a hot stirrer or the like for coating the catalyst particles with the ion exchange resin. However, this method cannot prevent the agglomeration of the obtained particles so that the particles are not uniform and their particle size is large (10 to 200 $\mu$m), and the resin coating is uneven. This is because the stirring is not uniformly propagated to all the dispersion and the agglomeration of the catalyst particles is accelerated due to the long period of time required for evaporating the solvent. Only part of the catalyst particles possess the catalytic activities so that sufficient electrode characteristics cannot be obtained even when the electrode is constituted by coating an electrode substrate with the electrode particles to form an electrocatalyst layer. The electrode characteristics are disadvantageously uneven due to the low reproducibility because the conditions for stirring are not constant at every preparation.

As another method for preparing the electrode of the electrochemical cell, a so-called filtration transfer method has been proposed which consists of impregnating carbon support catalysts with an ion exchange resin (solid polymer electrolyte) dispersion solution to prepare electrocatalyst particles coated with the solid polymer electrolyte, redispersing the electrocatalyst particles and transferring them on a carbon paper or the like followed by hotpressing. Since the electrocatalyst particles deeply penetrate into the current collector when the electrode prepared thereby is employed as an electrode of a fuel cell, the distance of a reaction gas supplied from the current collector side decreases to meet the electrocatalyst particles so that the flow-in of the reaction gas and the discharge of water vapor can be smoothly carried out especially at a high current operation condition.

However in this filtration transfer method, the formation of the thin electrocatalyst layer is difficult and time-consuming, and this trend is more remarkable especially in a larger electrode. While, as mentioned, the penetration of the catalyst particles into the current collector by means of the pressing is preferable in connection with the gas diffusion, the catalyst particles into the gas diffusion layer are not sufficiently used at a low current operating conditions. Further, the timing of the transfer is difficult to be suitably determined, the thickness of the electrocatalyst layer formed is likely to be ununiform if the electrode substrate is positioned in a complete horizontal direction at the time of the transfer, and the uniform formation of the electrocatalyst layer over the whole electrode substrate may be difficult even when the electrode substrate is positioned in a horizontal direction because the suction strength is not uniformly propagated to the whole surface of the electrode substrate so that the stringent control is required to prepare the suitable electrode.

In order to elevate the reaction efficiency in the solid polymer electrolyte electrochemical cell such as a fuel cell, the high gas diffusability is required. In the filtration transfer method, the particles of the catalyst layer formed by the suction at the time of the filtration are in contact with one another relatively compactly so that the space volume among the particles is relatively small to provide insufficient gas diffusability.

Although a further method has been proposed which consists of applying, by a spacula or the like, the mixture of catalyst particles and ion exchange resin, or of catalyst particles, ion exchange resin and hydrophobic resin on the surface of an electrode substrate, an electrocatalyst layer having a uniform thickness cannot be obtained because the mixture cannot be uniformly distributed on the surface of the substrate.

SUMMARY OF THE INVENTION

In view of the above drawbacks, an object of the present invention is to provide a process of preparing an electrode for a solid polymer electrolyte electrochemical cell having an electrocatalyst layer which is relatively thin and is excellent in electrode characteristics.

Another object of the present invention is to provide the above process in which the agglomeration of catalyst particles is depressed to obtain fine and uniform electrode particles prepared by coating the catalyst particles with ion exchange resin and hydrophobic resin.

A further object of the present invention is to provide a process of preparing an electrode for a solid polymer electrolyte electrochemical cell in which a relatively thin and uniform electrocatalyst layer which is excellent in gas diffusability can be obtained in a relatively short period of time.

A first aspect of the present invention is a process of preparing an electrode for a solid polymer electrolyte electrochemical cell having an electrocatalyst layer comprising catalyst particles and ion exchange resin, or catalyst particles, ion exchange resin and hydrophobic resin formed on the surface of an electrode substrate; which comprises spray-drying organic solvent dispersion containing the catalyst particles and the ion exchange resin, or the catalyst particles, the ion exchange resin and the hydrophobic resin in the mixed or pulverized state to granulate electrode particles in which the catalyst particles are coated with the the ion exchange resin or the ion exchange resin coated catalyst particles accompanied with the hydrophobic resin, and forming the electrocatalyst layer on the surface of the electrode substrate employing the electrode particles obtained.

When the electrode particles are prepared in accordance with the spray method of the first aspect of the invention, the electrode particles having the substantially same size and the substantially same ratio of the components can be obtained because the ratio of the catalyst particles and the ion exchange resin, or the catalyst particles, the ion exchange resin and the hydrophobic resin existing in water drops passing through a nozzle can be made nearly constant and the diameter of the water drops formed is maintained nearly constant by means of the constant inner diameter of the nozzle. Accordingly, the electrode prepared by coating the said electrode particles on the electrode substrate is excellent in its electrode characteristics because almost all the catalyst particles participate in the reaction so that the reaction can proceed at the high efficiency, for example, at the high current density or desired energy can be obtained when the solid polymer electrolyte electrochemical cell incorporating the said electrode is employed.

A second aspect of the present invention is a process of preparing an electrode for a solid polymer electrolyte electrochemical cell having an electrocatalyst layer comprising catalyst particles and ion exchange resin, or catalyst particles, ion exchange resin and hydrophobic resin formed on the surface of an electrode substrate; which comprises spraying organic solvent dispersion or paste containing the catalyst particles and the ion exchange resin, or the catalyst particles, the ion exchange resin and the hydrophobic resin in the pulverized state to the surface of the electrode substrate to form the electrocatalyst layer.

When the electrocatalyst layer is directly formed on the electrode substrate by means of the spray method in accordance with the second aspect of the present invention, the number of the manufacturing processes is decreased compared with that of a conventional filtration transfer method so that the electrocatalyst layer can be easily prepared. Further, the unevenness of the electrocatalyst layer due to the unevenness of the suction may be eliminated so that the solid polymer electrolyte electrochemical cell having the thin and uniform electrocatalyst layer can be obtained.

Similarly to the first aspect of the invention, the sufficient reproducibility can be achieved by maintaining the sufficient mixing and by making constant the diameter of the nozzle.

Since, further, no procedures such as pressing and suction are conducted at the time of forming the electrocatalyst layer which make the particles constituting the said layer compact, spaces having relatively large volumes are provided among the particles so that supply and discharge gases can pass smoothly through the electrocatalyst layer to elevate the gas diffusability of the electrode. When, accordingly, the electrode is employed, for example, in a fuel cell, a hydrogen gas and an oxygen gas supplied effectively reach to the surface of the electrode particles to take out energy at the high utilization rate.

A third aspect of the present invention is a process of preparing an electrode for a solid polymer electrolyte electrochemical cell having an electrocatalyst layer comprising catalyst particles and ion exchange resin, or catalyst particles, ion exchange resin and hydrophobic resin formed on the surface of an electrode substrate; which comprises positioning paste containing the above catalyst particles and the like in spaces among the surface of the electrode substrate and a plurality of wire members having a lower curved surface in contact with the surface of the electrode substrate, stretching the paste over the surface of the substrate to form a thin layer by moving the wire members and/or the substrate in relation to the substrate and/or the wire members and thermally treating the uniform electrocatalyst layer on the surface of the substrate.

According to the third aspect of the present invention, the development of the electrode substance is conducted by means of the movement of the wire members and/or the substrate so that, different from the conventional filtration transfer method. the electrocatalyst layer is easily formed even on the large electrode substrate, that is, even when the preparation of the large electrode is intended.

Further, the thickness of the electrocatalyst layer formed can be calculated by determining the amount of the electrode substance so that the electrocatalyst layer with the maximum activities may be formed by employing the minimum amount of the electrode substance.

Although the conventional filtration transfer method possesses the disadvantage of forming the uneven thickness of the electrocatalyst layer if the substrate is not completely horizontal, no adverse influence is produced in the process of the third aspect if the substrate is not horizontal.

As mentioned, in accordance with the process of this aspect, the thin and uniform electrocatalyst layer with the high catalyst activities may be formed employing the minimum amount of the electrode substance, and the larger electrode is also easily prepared.

A fourth aspect of the present invention is a process of preparing an electrode for a solid polymer electrolyte electrochemical cell having an electrocatalyst layer comprising catalyst particles and ion exchange resin, or catalyst particles, ion exchange resin and hydrophobic resin formed on the surface of an electrode substrate; which comprises uniformly coating the dry mixture of the above catalyst particles and the like on the surface of the electrode substrate, while maintaining the dry state, to form the electrocatalyst layer on the substrate.

While the process of this aspect includes a screen process, the electrocatalyst layer having fine pores more than those in a conventional electrode can be formed because a method of sucking the wet mixture to form the electrocatalyst layer employed in the conventional filtration transfer method is not employed so that the electrocatalyst layer can be formed while depressing the blockage of the fine pores in the electrocatalyst layer or controlling the degree of the blockage.

While, accordingly, the pressure loss is large or the permeation of the electrolyte to the catalyst layer is somewhat depressed, the gas is smoothly supplied, because of the said depression of the electrolyte, to be sufficiently in contact with the catalyst layer so that the desired reaction is promoted to elevate the electrode performance.

The volume of the pores in the electrocatalyst layer is desirably between 1.2 and 2.0 cc per 1 g of the catalyst support. In this range the electrode having the desired pores can be effectively and economically prepared.

DETAILED DESCRIPTION OF THE INVENTION

Figure 1:
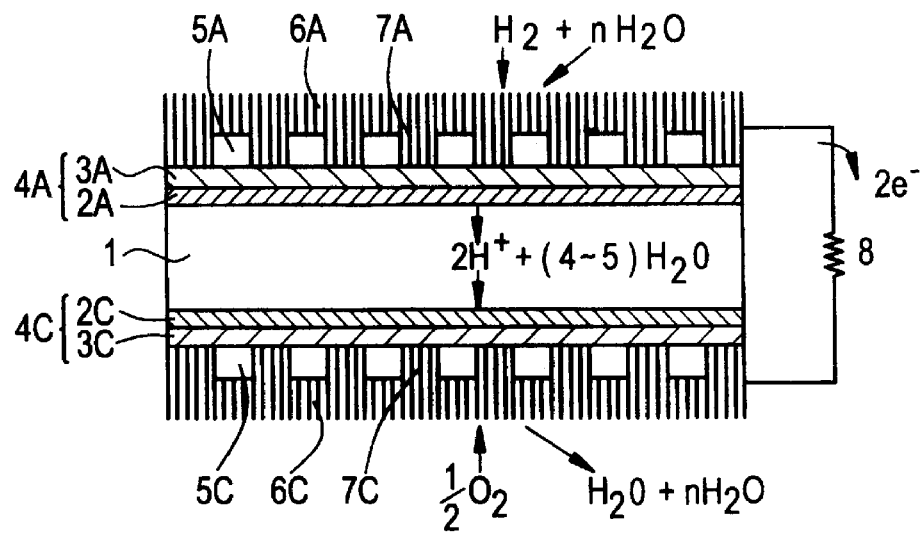
FIG. 1 is a schematic view showing a principle and constitution of a polymer electrolyte fuel cell.

In the first aspect of the present invention, the organic solvent dispersion containing the mixture of the catalyst particles and the ion exchange resin, or of the catalyst particles, the ion exchange resin and the hydrophobic resin is sprayed in place of a conventional method in which a solvent is evaporated by employing a stirrer. By employing the spray method, the electrode particles having the smaller particle size can be prepared because the organic solvent is instantly dried and the agglomeration of the particles may be prevented. The electrode with the high activities in which almost all the catalyst particles function as a catalyst can be obtained when the electrocatalyst layer is formed on the electrode substrate employing the above electrode particles.

The spraying may be conducted employing such an inert gas as nitrogen so that the organic solvent dispersion containing the mixture of the catalyst particles and the ion exchange resin, or of the catalyst particles, the ion exchange resin and the hydrophobic resin is forced to pass through a passage such as a nozzle having a smaller diameter at a relatively high speed. The said organic solvent passes through in the form of water drops because the diameter of the nozzle is small so that the catalyst particles pass through not in the form of agglomeration but in the form of a cluster having a relatively small size. The volume of the organic solvent constituting the respective water drops is small so that the solvent easily evaporates when it is sprayed through the nozzle and removed without a further drying treatment to produce the electrode particles in which the catalyst particles are coated with the ion exchange resin or with the ion exchange resin and the hydrophobic resin. In order to promote the evaporation of the solvent, the above mixture can be sprayed into a heated inert gas. Further, an inert gas employed for the spraying may also be heated.

When the mixing before the spraying is sufficiently conducted, the ratio between the catalyst particles and the ion exchange resin, or among the catalyst particles, the ion exchange resin and the hydrophobic resin in the respective water drops passing through the nozzle is made constant so that the electrode particles having the substantially same ratio can be obtained. The water drop size may be controlled by decreasing or increasing the diameter of the nozzle so as to suitably control the electrode particle size obtained. The constant nozzle diameter always enables the preparation of the electrode particles having the same size, and the employment of the constant amount of the above catalyst particles and the ion exchange resin, or of the catalyst particles, the ion exchange resin and the hydrophobic resin at the time of the mixing always enables the preparation of the electrode particles having the same ratio so that the sufficient reproducibility can be achieved.

Such a precious metal as platinum, palladium and ruthenium or its alloy which is loaded on a support such as carbon can be employed as the catalyst particles of the present invention. The ion exchange resin is preferably perfluorocarbonsulphonic acid, and fluorocarbon resin may be employed as the hydrophobic resin if required. The catalyst particles and the ion exchange resin (and the hydrophobic resin) must be sufficiently pulverized before or after the mixing and the both pulverized particles are mixed in the dry state. Alternatively, the mixture may be prepared by pulverizing the catalyst particles which are suspended in a commercially available ion exchange resin solution [for example, Nafion (trademark of Du Pont) solution]. The pulverization of the catalyst particles may be conducted by means of a ball mill or a roll, and the mixing and the pulverization of the catalyst particles and the ion exchange resin, or of the catalyst particles, the ion exchange resin and the hydrophobic resin may be conducted by means of an ultrasonic homogenizer, a ball mill, a roll or a Ko-neader. The catalyst particle size after the pulverization is preferably between 0.1 and 10 $\mu$m. The electrode substrate employed may be the same as an ordinary substrate and preferably a carbon paper.

The organic solvent employed is not especially restricted and selected from liquid organic compounds which are not reacted with the catalyst particles, the ion exchange resin or the hydrophobic resin and are volatile (its boiling point is desirably not more than 160° C., and the use of an alcohol such as isopropanol is desirable.

The organic solvent dispersion may be prepared by adding the catalyst particles and the ion exchange resin, or the catalyst particles, the ion exchange resin and the hydrophobic resin to the organic solvent and uniformly mixing them by means of sufficient agitation. The ratio of the solid of the catalyst particles, the ion exchange resin and the hydrophobic resin to the whole organic solvent dispersion, or the solid-containing rate is desirably between 0.5 and 15%.

While the spraying of the organic solvent dispersion is conducted by passing through the small diameter nozzle at a high velocity as mentioned, the nozzle diameter is adjusted between 0.1 and 2 mm, and the pressure which is preferably between 0.8 and 1.5 kg/cm$^2$ is so applied that the dispersion passes through the nozzle at a velocity between 1 and 10 g/minute. The preparation and the drying of the electrode particles can be simultaneously carried out, without the separate drying, by means of the evaporation of the organic solvent dispersion by scattering the dispersion through the nozzle to an inert gas atmosphere such as normal temperature atmosphere and nitrogen while maintaining the inlet of the nozzle at a relatively high temperature, for example, between 90° and 160° C., that is, can be carried out by simply passing the dispersion through the nozzle. The diameter of the electrode particles thus obtained is preferably between 1 and 50 μm.

The electrode particles thus obtained are coated on the surface of the electrode substrate by employing either of a wet method such as a filtration transfer method and a method in which pasted electrode particles are printed and of a dry method in which screening and suction are used so as to form the electrocatalyst layer to obtain the electrode for the solid polymer electrolyte electrochemical cell.

Since the electrode particles employed are uniform and fine particles prepared through the spray method almost all of which participate in a reaction, the electrode of the high performance can be obtained regardless of the selection of one of the above two preparation methods.

In the second aspect of the present invention, the organic solvent dispersion or paste containing the catalyst particles and the ion exchange resin, or the catalyst particles, the ion exchange resin and the hydrophobic resin is directly sprayed on the electrode substrate in place of a conventional method in which organic solvent dispersion containing the mixture of the above catalyst particles and the like is filtered under suction to form an electrocatalyst layer composed of the above mixture on an electrode substrate.

While, as mentioned, the uniform electrocatalyst layer is difficult to be formed in accordance with the filtration transfer method, the nearly uniform electrocatalyst layer can be formed in accordance with the second aspect of the invention by controlling the spray time and the spray volume at the respective points on the electrode substrate. In view of the producibility and the performance, the thickness of the electrocatalyst layer is desirably between 10 and 200 μm.

Similarly to the first aspect, the electrocatalyst layer is formed by passing the dispersion or the paste through the nozzle in the second aspect of the present invention so that the electrode having the uniform electrocatalyst layer can be obtained after the smooth evaporation of the organic solvent.

Since the electrocatalyst layer is formed by the simple drying without the pressing in this spray method, cracks may be produced in the layer which participate in the elevation of the gas diffusability.

The pressure loss which is the standard of evaluation of the gas diffusability of the electrocatalyst layer of the solid polymer electrolyte electrochemical cell prepared according the process of the second aspect is between 5 and 20 mm $H_2O$ per 1 mg-catalyst which is remarkably smaller than that of the electrocatalyst layer of the solid polymer electrolyte electrochemical cell prepared according to the conventional filtration transfer method. Accordingly, the gas diffusability of the electrocatalyst layer of the solid polymer electrolyte electrochemical cell prepared according to the invention is apparently excellent.

The reproducibility similar to that of the first aspect can be obtained in the second aspect because of the same reasons.

The catalyst, the ion exchange resin, the hydrophobic resin employed in this aspect may be the same as those of the first aspect. The sufficient pulverization of the catalyst particles is also necessary in this aspect, and the pulverization may be carried out similarly to the first aspect.

The organic solvent dispersion or paste may be prepared by adding the catalyst particles and the ion exchange resin, or the catalyst particles, the ion exchange resin and the hydrophobic resin to the organic solvent and uniformly mixing them by means of sufficient agitation. The solid-containing rate is desirably between 1 and 20%. The spray efficiency is low below 1% and the spray is difficult to be conducted and unstable over 20%.

In this aspect, the nozzle diameter is around 0.1 to 1 mm, and the pressure, preferably between 0.8 and 2 $kg/cm^2$, is so applied to the dispersion or the paste that it passes through the nozzle at the rate of between 1 and 20 g/minute. The electrode particle size of the electrocatalyst layer prepared in accordance with this spray method is desirably between 1 and 100 μm.

In the third aspect of the present invention, the paste containing the catalyst particles and the ion exchange resin, or the catalyst particles, the ion exchange resin and the hydrophobic resin is applied on the electrode substrate employing a plurality of the wire members to form the electrocatalyst layer in place of the conventional filtration transfer method.

When the respective lowest curved portions of the plurality of the wire members are in contact with the surface of the electrode substrate while contacting the adjacent members with each other, a plurality of spaces parallel to one another in the direction of the length of the wire members are formed among the adjacent wire members and the surface of the electrode substrate. The spaces are filled with the above paste, or the wire members are pressed on the paste applied in advance on the electrode substrate to fill the spaces with the paste. Even if the adjacent wire members are not in contact with each other, the spaces are filled with the paste.

If the plurality of the wire members horizontally moves preferably in the same or oblique direction of the length of the wire members while the substrate is fixed, or the substrate moves while the wire members are fixed, or the both moves, only the electrode substance in the spaces are left on the surface of the electrode substrate which is spontaneously made even because of its fluidity to coat the substrate with the uniform electrode substrate which is then sintered to form the electrocatalyst layer.

Since the formation of the electrocatalyst layer is conducted by the wire members in motion or in the fixed position in the process of this aspect, the disadvantage that the ununiform electrocatalyst layer is formed if the substrate is slightly slanted in which the thickness of the lower end of the electrocatalyst layer is thick and that of the highest end is thin is not presented in the third aspect so that the electrocatalyst layer having the uniform thickness is always obtained.

The movement of the wire members and/or the substrate is preferably conducted in the direction substantially in parallel to or oblique to the length of the wire members. In other words, for example, when a core rod around which a wire is wound is employed as the wire members, the movement of the wire members or the like may be conducted in the direction perpendicular to or oblique to the core rod. If the wire members or the like moves in the direction parallel to the core rod, the electrode substance in the spaces moves on the surface of the substrate with the wire members to leave no substance on the substrate surface.

If the wire members or the substrate moves in the direction perpendicular to or oblique to the core rod, the electrode substance in the spaces remains on the surface of the substrate which is, as mentioned, spontaneously made even because of its fluidity to form the uniform electrocatalyst layer on the electrode substrate.

The thickness of the electrocatalyst layer equals to a value obtained by dividing the amount of the electrode substance in the above spaces by the area of the electrocatalyst layer formed so that the electrocatalyst layer having a desired thickness can be formed by adjusting the amount of the electrode substance. In reality, the thickness of the wire members and the shape of the lower curved portions may be controlled to determine the sectional area of the spaces formed among the adjacent wire members and the substrate. For example, when the wire is wound around the core rod to form the plurality of the wire members, the thickness of the electrocatalyst layer may be determined by changing the thickness of the wire or by adjusting the intervals between the adjacent wire members which are not in contact with each other. A screwed member having a bolt-like shape manufactured by employing a lathe or the like may be substituted with the above wire members.

The thin layer formation in accordance with the above method is not necessarily carried only once, but especially in case of the thick electrocatalyst layer, the layer formation can be repeated to obtain an electrocatalyst layer composed of a plurality of layers. In accordance with this repeating method, the formation of cracks is more effectively prevented than that prepared by means of a single formation step, and especially when the sinterings are repeated every thin layer formation, this effect is remarkable. When the repeating method is employed, it is preferred that the direction of the substrate changes so that the wire members moves in the direction perpendicular to the direction of the previous treatment to more uniformly coat electrode substance. Further, in accordance with the repeating method, the compositions of the respective layers may be changed, that is, the composition ratio among the ion exchange resin, the catalyst and the hydrophobic resin and the kinds thereof may be changed in the direction of the thickness of the electrode or the porosity may be changed to prepare an electrode structure which enables the effective progress of the reaction.

Even if the surface area of the electrode substrate is increased or the preparation of the large electrode is intended, the electrocatalyst layer having the uniform thickness can be obtained because the uniform force may be applied to the electrode substance by making the length of the wire members longer or the diameter of the core rod thicker.

Since, further, the volume of the spaces may be calculated in advance and controlled, the electrocatalyst layer having the thin and uniform layer or the maximum catalyst activities may be formed by employing the minimum amount of the electrode substance. Moreover, the electrocatalyst layer can be thinner so that the gas flow in the said electrocatalyst layer smoothly diffuses to elevate the reaction velocity.

The catalyst, the ion exchange resin, the hydrophobic resin employed in this aspect may be the same as those of the preceding aspects. The preparation of the paste is also carried out similarly to the above aspects.

When the above catalyst layer is formed on a porous current collector, the porous current collector preferably a carbon paper is employed. When the above catalyst layer is formed on an ion exchange resin membrane functioning as an electrolyte, the electrolyte may be employed as the substrate. The material of the wire members are not restricted provided that it does not exert an adverse effect on the electrode substance and the substrate, and is selected from material which possesses low affinity with the electrode substance and is not likely to be adhered. Such material as glass, rigid resin and stainless steel is preferable. While the end shape of the wire members and the process of preparing same are not restricted, the wire members are preferably formed, as mentioned, by winding the wire around the core rod to be prepared as a coil-like member in which the adjacent wires are in contact with each other. Employing the wire members having the said shape, the electrode substance can be most smoothly rolled to the thin layer on the substrate surface.

When the slightly excessive amount of the paste compared with the theoretical amount is applied to the substrate surface and the above wire members being in contact with one another are pressed thereon, the lower ends of the wire members are in contact with the substrate surface so as to push the paste containing the electrode substance into the spaces to fill the spaces with the paste. It is also possible to initially contact the wire members to the substrate surface and to fill the spaces with the electrode substance.

Thereafter, the electrocatalyst layer can be prepared as already mentioned.

In accordance with the process of this aspect, the thickness of the electrocatalyst layer may be made thinner than 10 $\mu$m which has not been attained in the prior art. The said thickness of the layer is desirably between 2 and 40 $\mu$m.

Figure 2:
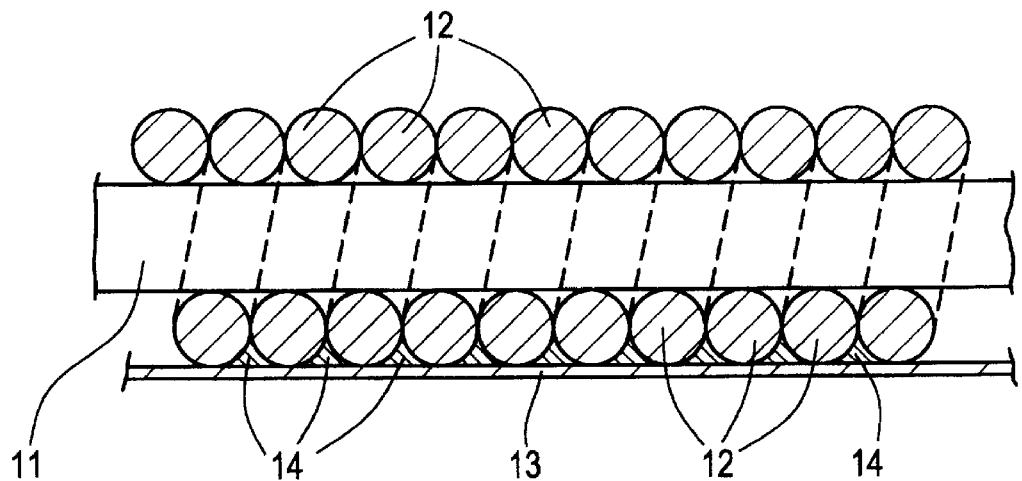
FIG. 2 is a schematic sectional view showing the situation in which spaces are filled with electrode substance.
Figure 3:
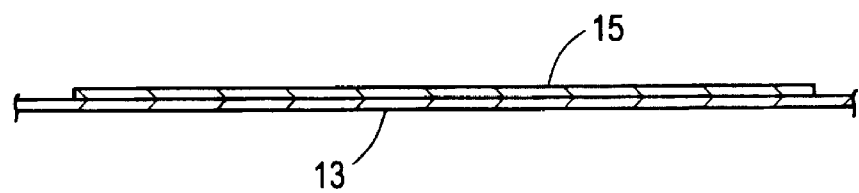
FIG. 3 is a schematic sectional view showing the situation in which an electrocatalyst layer is formed on an electrode substrate after the movement of wire members.

FIG. 2 is a schematic sectional view showing a situation in which spaces formed between adjacent wire members are filled with electrode substance, and FIG. 3 is a schematic sectional view showing a situation in which an electrocatalyst layer is formed on an electrode substrate after the movement of the wire members.

As shown in FIG. 2, one wire is wound around a core rod 11 to form a plurality of wire members 12 being in contact with each other in the shape of a coil. The wire members 12 are pressed to an electrode substrate 13 to fill spaces among the wire members 12 and the surface of the substrate 13 with electrode substance 14. If the wire members 12 or the substrate 13 is forced to move in the direction perpendicular to the length of the core rod 11, only the electrode substrate 14 remains on the surface of the substrate 13 and the electrode substrate 14 is made even because of its fluidity to form an electrocatalyst layer 15 made of the electrode substance on the surface of the substrate 13 as shown in FIG. 3.

According to the fourth aspect of the present invention, the dry mixture powder containing the catalyst particles and the ion exchange resin, or the catalyst particles, the ion exchange resin and the hydrophobic resin is coated on the electrode substrate while maintaining the dry state of the powder to form the electrocatalyst layer.

The process of preparing the electrode of the solid polymer electrolyte electrochemical cell employing the dry mixture powder includes a screen method employing a porous screen.

In the screen method, after the porous screen is positioned over the electrode substrate and a tightly closed space is formed at the other side of the electrode substrate, the dry mixture powder is supplied on the screen and the mixture is sucked from the closed space through the substrate employing a pump or the like. In this way, the mixture on the screen moves through the meshes of the screen to the surface of the electrode substrate. In this procedure, the sucking force is uniformly applied on the lower surface so that the mixture on the screen passes through the screen nearly uniformly to reach to the surface of the electrode substrate to form the nearly uniform electrocatalyst layer.

The mesh of the screen is desirably between 80 and 350 mesh. When the mesh is coarse, the mixture powder passes through the screen to the surface of the electrode substrate only by the suction, but when the mesh is fine, the mixture powder is difficult to pass through so that the powder is pressed to the surface of the screen which is then swept with, for example, a rigid resin plate to smoothly pass through the screen to the substrate surface.

The mixture powder on the substrate surface is fixed thereon by the above sucking force, but the sufficient fixation cannot be sometimes obtained by means of only the sucking force so that the rigid electrocatalyst layer is desirably formed by pressing the mixture on the substrate surface by means of coldpressing or hotpressing.

The volume of the mixture powder migrated to the substrate surface per unit time is controlled by the sweep speed, the mesh number and the sucking force thereby forming the electrocatalyst layer on the surface of the electrode substrate at a desired speed.

When the electrocatalyst layer of the electrode for the solid polymer electrolyte electrochemical cell is prepared in accordance with the process of this aspect, the number of fine pores of which a diameter is between 100 nm and 1 $\mu$m increases so that the number of a relatively large pores decreases because the suction under the wet condition is not conducted different from the wet process such as the filtration transfer method. Accordingly, the pressure loss increases to decrease the cracks so as to exhibit the trend of depressing the permeation of the electrolyte to the catalyst layer. As a result, the supplied gas can easily reach to the catalyst layer so that the reaction between the electrolyte and the gas is promoted.

The pore volume of the electrocatalyst layer per 1 g of the catalyst support is desirably in the range between 1.2 and 2.0 cc/g, and the pressure loss per 1 mg of the catalyst support is desirably between 40 and 400 mmH$_2$O/mg. These values are maintained in the respective ranges by controlling the suction force or the like. When the above pore volume is below 1.2 cc/g, the pore volume is substantially the same as that of the prior art so that the effect produced by the increase of the pore volume cannot be obtained. On the other hand, when the above pore volume is over 2.0 cc/g, the effect is substantially same as that of 2.0 cc/g so that the further increase of the pore volume is unnecessary.

The catalyst, the ion exchange resin, the hydrophobic resin employed in this aspect may be the same as those of the preceding aspects.

Figure 4:
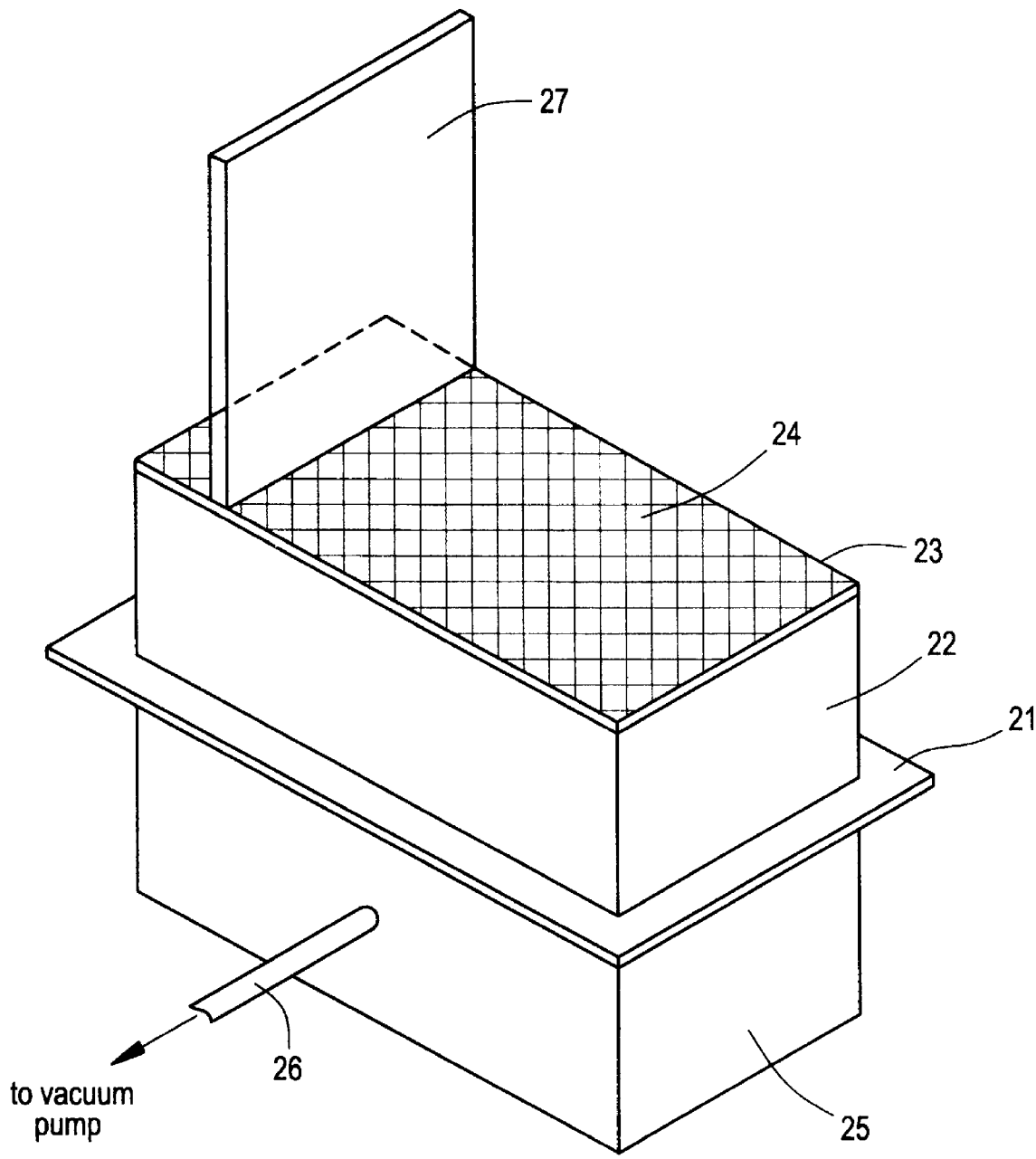
FIG. 4 is a schematic perspective view showing procedures of forming an electrocatalyst layer employing a screen method.

FIG. 4 is a schematic view showing a procedure of forming an electrocatalyst layer on the surface of an electrode substrate in accordance with a screen method.

A thin rectangular cylindrical frame 22 is positioned on the upper surface of an electrode substrate 21 in the shape of sheet such as a carbon paper and on the upper end of the frame 22 is tightly adhered a porous screen 23. The mixture powder 24 consisting of catalyst particles and ion exchange resin, or catalyst particles, the ion exchange resin and hydrophobic resin is scattered on the screen 23.

A suction frame 25 having the same shape as that of the above frame 22 and having the bottom is located on the lower surface of the electrode substrate 21 and a gas in the frame 25 is deaerated by means of a vacuum pump (not shown) connected through a suction tube 26 equipped on the side surface of the frame 25.

When the mixture powder 24 on the screen 23 is swept with a rigid resin plate 27 while the vacuum pump is operated, the powder 24 drops through pores of the screen 23 to the space in the frame 22 and further drops to adhere to the electrode substrate 21 by means of the suction force. Since the apertures of the screen 23 are uniformly distributed, the powder 24 on the screen 23 also drops equally through the apertures. Because of omnipresence, the uniform electrocatalyst layer is formed on the electrode substrate 21. If the height of the frame 22 is increased, slight uneven distribution of the powder presence, even if produced on the screen, may be absorbed during the drop in the space in the frame 22 to form a further uniform electrocatalyst layer.

EXAMPLES

Although Examples of the preparation of the electrode for the solid polymer electrolyte electrochemical cells in accordance with the present invention will be illustrated, these are not construed to restrict the invention.

Example 1

After carbon powder was impregnated with a chloroplatinic acid aqueous solution (platinum concentration: 5 g/liter), a platinum-carbon catalyst of which a platinum support amount was 30% in weight was prepared by thermal decomposition treatment. After 0.5 g of the platinum-carbon catalyst and 7 g of a commercially available ion exchange resin solution [(Nafion (trademark of Du Pont) solution] were mixed in 40 ml of iso-propanol, the mixture was agitated for 20 minutes employing an ultrasonic homogenizer to prepare organic solvent dispersion (solid-containing rate was about 3%).

After the organic solvent dispersion was placed inside of a spray heated to 100° C. and having a nozzle diameter of about 0.4 mm, the dispersion was sprayed to atmosphere at a spray pressure of 1 kg/cm$^2$ and a dispersion supply rate of 5 g/minute to obtain electrode particles having particle size distribution between 3 and 7 $\mu$m.

The electrode particles were dispersed in ethanol. After the dispersion was filtered to adhere the electrode particles on a filter paper with a small amount of the alcohol remaining on the filter paper, the filter paper was transferred by coldpressing at 25 kg/cm$^2$ with a hydrophobically treated carbon paper of which a thickness was 360 $\mu$m functioning as a current collector followed by hotpressing at 130° C. and 25 kg/cm$^2$ to prepare an electrode equipped with the current collector.

Figure 5:
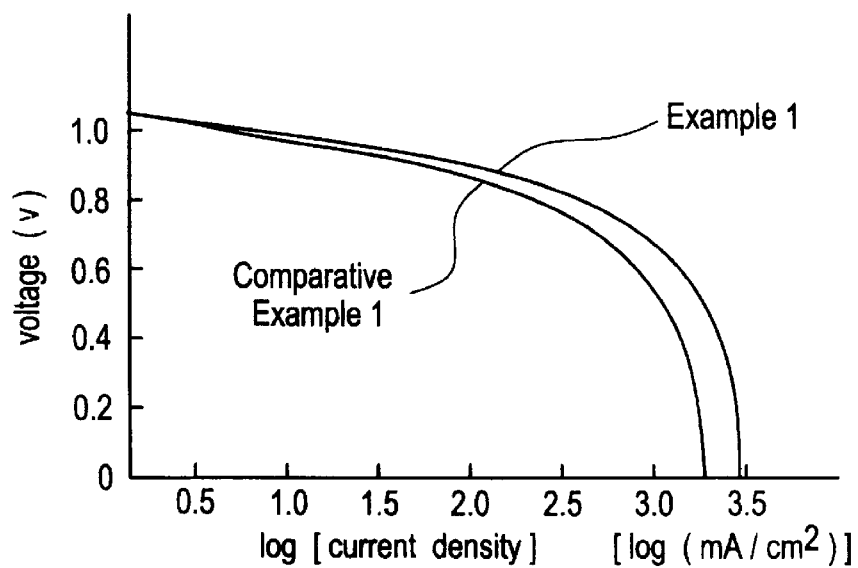
FIG. 5 is a graph showing the relation between a current density and a voltage of electrodes prepared in Example 1 and Comparative Example 1.

After a fuel cell was assembled by employing the electrode and an ion exchange membrane (tradename: Nafion 115), the relation between a current density [log(mA/cm$^2$)] and a voltage (V), and current densities at 0.9 V, 0.7 V and 0 V of a reaction in which a hydrogen gas humidified and heated at 90° C. and a non-humidified oxygen gas were supplied at 1 atm., with a hydrogen flow rate of 130 ml/minute and an oxygen flow rate of 300 ml/minute were measured. The results are shown in FIG. 5 and Table 1.

Comparative Example 1

Electrode particles were prepared by evaporating the organic solvent while stirring and heating the organic solvent dispersion prepared in Example 1 with a stirrer. The particle size distribution of the electrode particles obtained was between 10 and 200 $\mu$m.

An electrode equipped with a current collector was prepared similarly to Example 1 by employing the electrode particles and the relation between a current density [log(mA/cm$^2$)] and a voltage (V), and current densities at 0.9 V, 0.7 V and 0 V were measured by employing the electrode. The results are shown in FIG. 5 and Table 1.

TABLE 1

| Voltage (V) | Current Density (mA/cm$^2$) | |
| --- | --- | --- |
| | Example 1 | Comparative Example 1 |
| 0.9 | 25.6 | 28.9 |
| 0.7 | 1304 | 856 |
| 0 | 2831 | 1986 |

It is apparent from FIG. 5 and Table 1 that the electrode characteristics of Example 1 were superior to those of Comparative Example 1.

Example 2

The organic solvent dispersion prepared in Example 1 was placed inside of a spray having a nozzle of which an inner diameter was about 1 mm and was sprayed on a carbon paper at a spray pressure of 1 kg/cm$^2$ and a supply rate of 5 g/minute to form an electrocatalyst layer having a thickness of about 100 μm of which a platinum concentration was 1 mg/cm$^2$.

Figure 6:
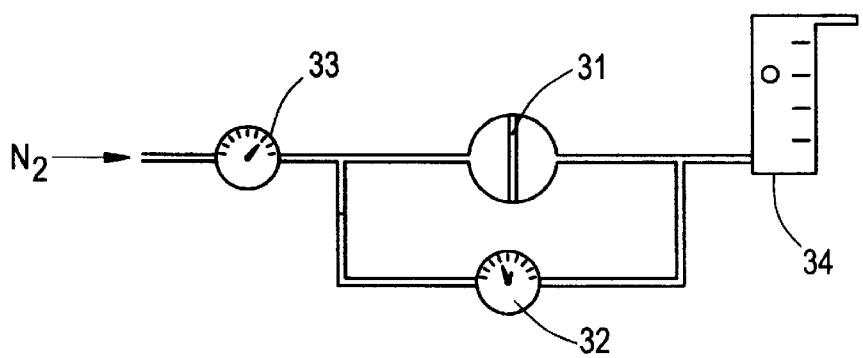
FIG. 6 is a schematic view showing an apparatus for measuring a pressure loss employed in Example 2 and Comparative Example 2.

Then, a pressure loss of the electrocatalyst layer obtained was measured to be 12 (mm H$_2$O/mg-catalyst layer) employing an apparatus of measuring a pressure loss shown in FIG. 6.

The apparatus of FIG. 6 consisted of the electrocatalyst layer 31 and a manometer 32 connected in parallel, a pressure gauge 33 at the inlet side and a flow meter 34 at the outlet side. The measurement was conducted under the following conditions.

Pressure: 2 kg/cm$^2$

Gas Employed and Its Flow Rates: Nitrogen, 10 liter/min.

Temperature: 25° C.

Figure 7:
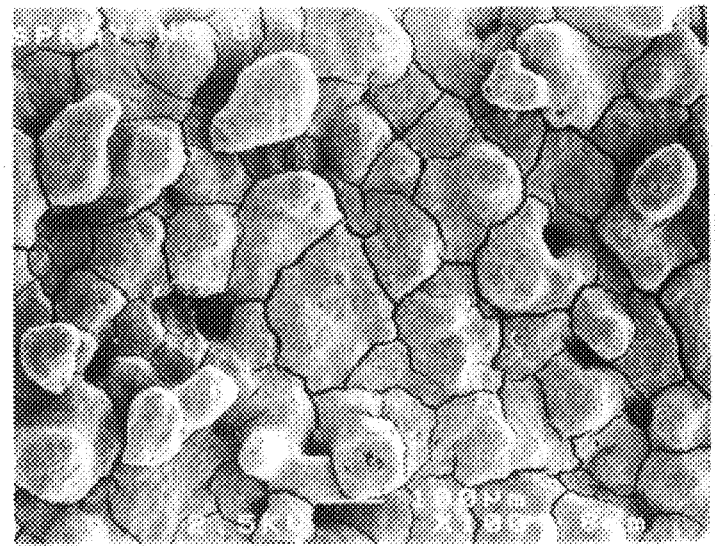
FIG. 7 is a microphotograph of 100 magnifications showing a particle structure of an electrocatalyst layer prepared in Example 2.

FIG. 7 is a microphotograph of 100 magnifications showing the particle structure of the electrocatalyst layer prepared in this Example.

Comparative Example 2

Electrode particles were prepared by evaporating the organic solvent in the organic solvent dispersion prepared in Example 2 while stirring the dispersion with a stirrer. The particle size obtained was between 10 and 200 μm.

The electrode particles were dispersed in ethanol which was then filtered under suction to adhere the particles in the thickness of 40 μm on a filter paper, and a catalyst layer was formed at the electrode substrate side by means of transfer followed by drying to obtain an electrocatalyst layer.

A pressure loss of the electrocatalyst layer obtained was measured to be 78 (mm H$_2$O/mg-catalyst layer) employing the apparatus shown in FIG. 6.

Figure 8:
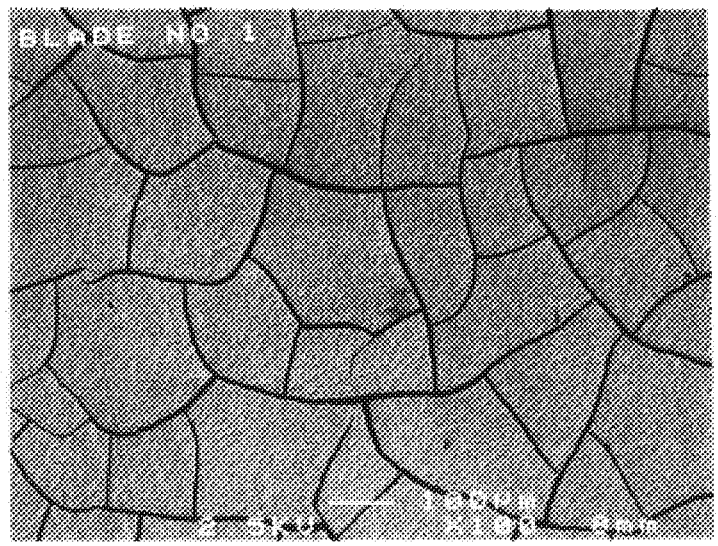
FIG. 8 is a microphotograph of 100 magnifications showing a particle structure of an electrocatalyst layer prepared in Comparative Example 2.

FIG. 8 is a microphotograph of 100 magnifications showing the particle structure of the electrocatalyst layer prepared in this Comparative Example.

When the values of the pressure losses of the electrocatalyst layers of Example 2 and Comparative Example 2 are compared with each other, the pressure loss of the electrocatalyst layer obtained in Example 2 is remarkably smaller so that it is apparent that the pressure loss of the electrocatalyst layer prepared by the spray method is small to exhibit the excellent gas diffusability.

Example 3

The mixture of 1.4 g of the platinum-carbon catalyst (platinum particle size was about 20 to 50 Å) and of 20 g of a commercially available ion exchange resin solution (Nafion solution) was dispersed employing a planetary mill to prepare paste. The solid-containing rate of this paste was about 12%.

After the paste was developed on a carbon paper (length: 130 mm; width: 130 mm, thickness: 0.36 mm) which was a substrate hydrophobically treated with polytetrafluoroethylene (PTFE), a plurality of wire members were formed by winding a stainless steel wire having a thickness of 1.2 mm around a core rod. The adjacent wire members were in contact with each other around the core rod.

Thereafter, the core rod was forced to move in the direction perpendicular to the length of the said core rod to make even the paste to form a uniform layer which was then hotpressed at 130° C. and 10 kg/cm$^2$.

The thickness of the electrocatalyst layer formed was measured to be in the range between 5 and 7 μm and the electrocatalyst layer was substantially the uniform layer.

Comparative Example 3

After the paste of Example 3 was deposited on a filter paper by means of filtration under weak suction, it was transferred with the same carbon paper as that of Example 3 by the coldpressing at a pressure of 25 kg/cm$^2$ followed by the hotpressing at 130° C. and 25 kg/cm$^2$ to form an electrocatalyst layer. The thickness of the electrocatalyst layer formed was measured to be in the range between 5 and 20 μm and the considerable scattering was observed.

Example 4

After carbon powder was impregnated with a chloroplatinic acid aqueous solution (platinum concentration: 5 g/liter), a platinum-carbon catalyst of which a platinum support amount was 30% in weight was prepared by thermal decomposition treatment (average particle size: about 5 μm). 1.43 g of the platinum-carbon catalyst and 20 g of a commercially available ion exchange resin solution (Nafion solution) were mixed and agitated employing an ultrasonic homogenizer to prepare dry mixture powder after drying by means of a spray method.

A thin cylindrical frame having an inner diameter of 3.2 cm and a thickness of 50 mm was placed on the surface of a carbon paper (length: 40 mm; width: 40 mm, thickness: 360 μm) which was a substrate hydrophobically treated with PTFE, and a stainless steel screen having 250 mesh was fixed at the upper end of the frame. Under the carbon paper was formed a tightly closed space to which a vacuum pump was connected.

On the screen surface 60 mg of the above mixture powder was scattered and was sucked by means of the vacuum pump while sweeping the powder with a resin plate. The powder was dropped through the screen to the carbon paper and was deposited thereon. Further, the coldpressing was conducted at a pressure of 10 kg/cm$^2$.

Figure 9:
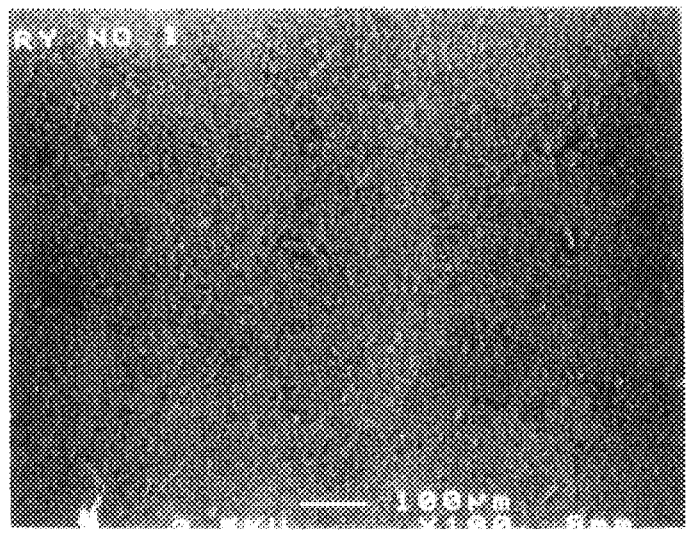
FIG. 9 is a microphotograph of 100 magnifications showing a particle structure of an electrocatalyst layer prepared in Example 4.

The electrocatalyst layer obtained had no cracks as shown in a microphotograph of FIG. 9 and had a uniform thickness of about 100 μm.

The pore volume of the said electrode substrate was measured by employing a mercury porosimeter to be 1.45 cc/g-catalyst support.

Then, the pressure loss was measured by employing the apparatus shown in FIG. 6 to be 128 mm $H_2O$/g-catalyst support. An electrode substrate having an electrocatalyst layer of which an electrode area was 3.0 $cm^2$ was employed as the electrocatalyst layer 31. An input side pressure was 1 $kg/cm^2$. A nitrogen gas was flown at a temperature of 25° C. and at a gas flow rate of 200 ml/min.

Figure 11:
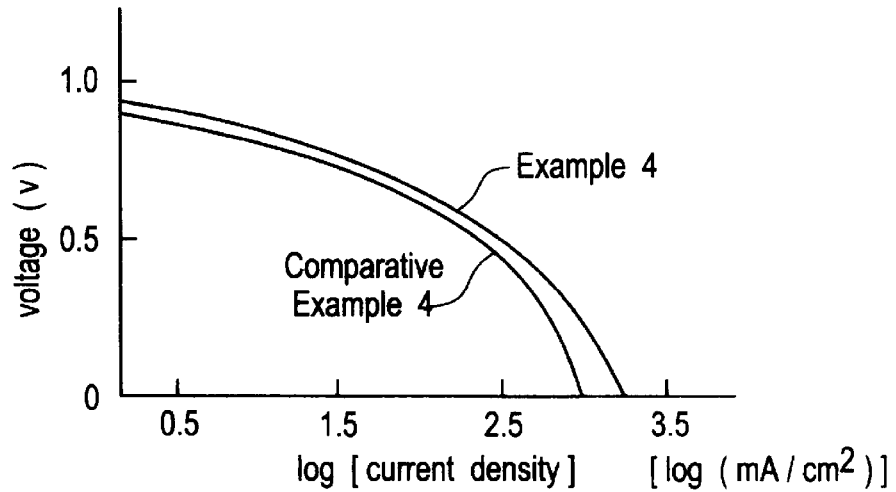
FIG. 11 is a graph showing the relation between a current density and a voltage of electrodes prepared in Example 4 and Comparative Example 4.

Another electrode substrate containing an electrocatalyst layer having the dimensions of 5 cm×5 cm and loading platinum in the concentration of 1.00 $mg/cm^2$ was prepared in accordance with the same procedures. Employing the substrate as an electrode, a reaction was conducted by supplying a hydrogen of which a flow rate was 1000 ml/min. and an oxygen of which a flow rate was 2000 ml/min. In this reaction, the relation between the current density [log (mA/$cm^2$)] and the voltage [V] was measured. The result thereof is shown in FIG. 11. The limit current value under the same conditions was measured to be 2144 $mA/cm^2$.

Comparative Example 4

After 60 mg of the mixture powder of Example 4 was dispersed in ethanol and the dispersion was filtered under suction and deposited on a filter paper in the thickness of 40 μm, it was transferred to the electrode substrate side to form an electrocatalyst layer.

Figure 10:
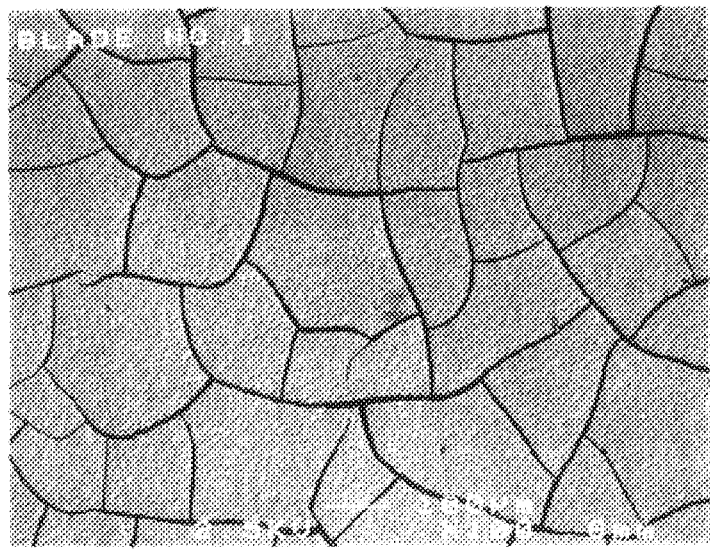
FIG. 10 is a microphotograph of 100 magnifications showing a particle structure of an electrocatalyst layer prepared in Comparative Example 4.

The electrocatalyst layer obtained (circular shape having a diameter of 3.2 μm) had many cracks and had a thickness of about 40 μm as shown in a microphotograph of 100 magnifications of FIG. 10 showing the catalyst structure thereof.

The pore volume of the electrode was measured in accordance with the same procedures as those of Example 4 to be 0.56 cc/g-catalyst support.

The pressure loss was measured under the same conditions as those of Example 4 except that a pressure was 2 $kg/cm^2$ and a gas flow was 10 liter/min., to be 78 mm $H_2O$/g-catalyst support.

The relation between the current density [log (mA/$cm^2$)] and the voltage [V] was measured under the same conditions as those of Example 4 and employing the above electrode. The result thereof is shown in FIG. 11. The limit current value under the same conditions was measured to be 1623 $mA/cm^2$.

When the respective electrode performances of Example 4 and Comparative Example 4 are compared with each other, the electrode of Example 4 was more excellent in the voltage value obtained at the same current density, and the limit current value and the electrode of Example 4 possessed the larger pore volume and pressure loss.

What is claimed is:

1. A process for forming an electrocatalyst layer on the surface of an electrode for a solid polymer electrolyte electrochemical cell which comprises spray-drying an organic solvent dispersion or paste containing pulverized particles of: (a) an electro-catalyst and an ion exchange resin, or (b) an electrocatalyst, an ion exchange resin and a hydrophobic resin, onto the surface of the electrode so as to produce an electrocatalyst layer comprising granulated electrocatalyst particles coated with the ion exchange resin or coated with the ion exchange resin and the hydrophobic resin.

2. The process of claim 1 wherein the electrocatalyst layer has a thickness of 10–200 μm.

* * * * *